United States Patent

[11] 3,627,813

[72] Inventors Franklin W. Abbate
North Haven;
William J. Farrissey, Jr., North Branford, both of Conn.
[21] Appl. No. 796,209
[22] Filed Feb. 3, 1969
[45] Patented Dec. 14, 1971
[73] Assignee The Upjohn Company
Kalamazoo, Mich.

[54] PROCESS OF PREPARING CARBAMATES
10 Claims, No Drawings
[52] U.S. Cl. .................................................. 260/471 C,
260/468 C, 260/482 B, 260/482 C
[51] Int. Cl. ...................................................C07c125/06
[50] Field of Search........................................ 260/468 C,
471 C, 482 B, 482 C

[56] References Cited
UNITED STATES PATENTS
3,335,139  8/1967  Martinek et al. .............  260/471 C

*Primary Examiner*—Lorraine A. Weinberger
*Assistant Examiner*—L. Arnold Thaxton
*Attorneys*—Eugene O. Retter and Denis A. Firth

ABSTRACT: N,N'-dihydrocarbylureas are converted to the corresponding alkyl N-hydrocarbylcarbamates by heating at 60° C. to 200° C. with a dialkylcarbonate in the presence of a base catalyst (tertiary amine preferred). The process can be applied to simple ureas and to compounds containing a plurality of 3-hydrocarbyl-ureido groups in the molecule. The process can also be employed to modify polyurethanes containing one or more urea linkages in the polymer chain; the latter is cleaved at one or more of the urea linkages with the formation of the corresponding carbamate-terminated polymer.

A PROCESS OF PREPARING CARBAMATES

BACKGROUND OF THE INVENTION

1. Field of the Invention

This invention relates to the conversion of N,N'-dihydrocarbylureas to the corresponding alkyl N-hydrocarbylcarbamates and is more particularly concerned with the catalytic reaction of N,N'-dihydrocarbylurea with a dialkylcarbonate to yield the corresponding alkyl N-hydrocarbylcarbamate and with the application of said process to the cleavage of ureido linkages in polymeric compounds.

2. Description of The Prior Art

It is known that reaction of an N,N'-dialkylurea with a dihydrocarbyl carbonate at high temperature (above about 200° C) gives rise to the alkyl isocyanate and corresponding hydrocarbyl alcohol and that the alkyl isocyanate distills spontaneously from the reaction mixture; see U.S. Pat. No. 3,190,905.

We have now found that, if the reaction between an N,N'-di(hydrocarbyl)-urea and a dialkylcarbonate is carried out at lower temperatures than the above and in the presence of a base catalyst, there is produced the corresponding alkyl N-hydrocarbylcarbamate. We have found further that, if the latter reaction is carried out in the absence of any catalyst, no significant conversion of the urea takes place and the reactants are recovered substantially unchanged.

Our finding is even more surprising in that it is recognized in the art (see U.S. Pat. No. 2,713,591) that N-hydrocarbylcarbamates are decomposed on heating in the presence of base catalysts to yield the corresponding hydrocarbyl isocyanate and the alcohol corresponding to the esterifying radical in the starting carbamate. One would therefore expect, contrary to our findings, that the reaction of an N,N'-di(hydrocarbyl)urea and a dialkylcarbonate in the presence of a base catalyst would yield the corresponding hydrocarbyl isocyanate and alkanol and not the alkyl N-hydrocarbylcarbamate.

BRIEF DESCRIPTION OF THE INVENTION

Our invention comprises a process for the preparation of an alkyl N-hydrocarbylcarbamate which process comprises heating, at a temperature within the range of about 60° C. to about 200° C., a compound containing at least one 3-hydrocarbylureido moiety wherein the hydrocarbyl moiety corresponds to that in the desired alkyl N-hydrocarbylurethane, with a dialkyl carbonate in the presence of a catalytic amount of a base.

DETAILED DESCRIPTION OF THE INVENTION

The process of the invention, as applied to the preparation of an alkyl N-hydrocarbylcarbamate from a compound containing a single 3-hydrocarbylureido group, can be represented by the following equation: RNHCONHR' + CO(OAlkyl)2 → RNHCOOAlkyl + R'NHCOOAlkyl wherein R and R' each represent monovalent hydrocarbyl as hereinafter defined. Where R and R' are identical the two molecules of carbamate formed in the reaction will be identical. Where R and R' are different the product of reaction will be a mixture of two different alkyl N-hydrocarbylcarbamates.

Similarly, the process of the invention, as applied to the preparation of an alkyl N-hydrocarbylcarbamate from a compound containing two 3-hydrocarbylureido groups, can be represented by the following equation:
RNHCONH - R'' - NHCONHR' + 2 CO(OAlkyl)2 →
RNHCOOAlkyl + AlkylOOCHN - R''- NHCOOAlkyl + R'NHCOOAlkyl wherein R and R' represent monovalent hydrocarbyl, as hereinafter defined, and R'' represents divalent hydrocarbyl as hereinafter defined. As will be seen, when R and R' are identical, the reaction gives rise to a mixture of two mono N-hydrocarbylcarbamates and a dicarbamate. When R and R' are different, the reaction gives rise to a mixture of two different N-hydrocarbylcarbamates and a dicarbamate.

As will be obvious to one skilled in the art, similar reaction mechanisms can be written to illustrate the course of reaction when the process of the invention is applied to the conversion of a compound containing three or more 3-hydrocarbylureiodo groups.

The term "3-hydrocarbylureido" means the group $-\overset{1}{N}H\overset{2}{C}O\overset{3}{N}HR_1$ wherein $R_1$ represents hydrocarbyl as hereinafter defined. It is to be noted that $R_1$ can be a divalent hydrocarbyl moiety forming part of a chain having recurring urea groups as discussed in more detail hereinafter.

The term "hydrocarbyl" as used throughout this specification means the monovalent and polyvalent radicals obtained by removing one or more hydrogen atoms from the parent hydrocarbon, preferably a hydrocarbon containing from one to 18 carbon atoms, inclusive. Illustrative of monovalent hydrocarbyl are alkyl such as methyl, ethyl propyl, butyl, pentyl, hexyl, octyl, decyl, dodecyl, hexadecyl, octadecyl, and the like including isomeric forms thereof; alkenyl such as allyl, butenyl, pentenyl, hexenyl, octenyl, and the like including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like including isomeric forms thereof; and cycloalkenyl such as cyclopentenyl, cyclohexenyl, cycloheptenyl, and the like, including isomeric forms thereof.

Illustrative of divalent hydrocarbyl are arylene such as phenylene, tolylene, naphthylene, and the like; alkylene such as methylene, ethylene, trimethylene, 1,2-propylene, hexylene, octylene, dodecylene, and the like; alkylene interrupted by arene such as

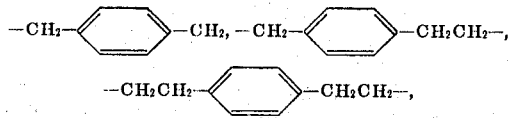

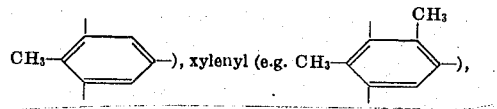

and the like; alkenylene such as propenylene, butenylene, octenylene, dodecenylene, and the like; cycloalkylene such as 1,2-cyclopentylene, 1,3-cyclohexylene, 1,2-cycloheptylene, 1,4-cycloheptylene, 1,3-cyclooctylene, and the like.

Illustrative of trivalent hydrocarbyl are alkane-triyl such as 1,2,3-propanetriyl, 1,2,3-hexanetriyl, 1,3,8-octanetriyl, and the like; alkenetriyl, such as 1-propene-1,2,3-triyl, 1-butene-1,2,4-triyl, 2-hexene-1,3,4-triyl, 3-octene-1,3,8-triyl, and the like; arenyl (trivalent aromatic hydrocarbyl) such as phenyl, tolenyl (e.g.

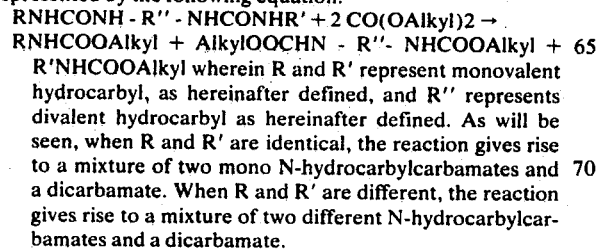

and the like.

Said monovalent and polyvalent hydrocarbyl groups can be unsubstituted, i.e. can be free of groups other than those containing exclusively carbon and hydrogen, or can be substituted by one or more groups such as cyano; nitro; halo (i.e. chloro, bromo, fluoro, and iodo); alkoxy, for example, methoxy, ethoxy, propoxy, butoxy, pentyloxy, hexyloxy and isomeric forms thereof; alkenyloxy, for example, allyloxy, butenyloxy, pentenyloxy, hexenyloxy, and isomeric forms thereof; and the like.

The term "alkyl" as used throughout the specification and claims means alkyl containing from one to eight carbon atoms, inclusive. Illustrative of alkyl are methyl, ethyl, propyl, butyl, pentyl, hexyl, heptyl, and octyl including isomeric forms thereof.

In order to illustrate more fully the manner in which the process of the invention can be carried out, reference will now be made to the procedure for carrying out a specific embodiment thereof; namely, the application of the process of the invention to the preparation of an alkyl N-hydrocarbylurethane from a compound containing only one 3-hydrocarbylureido group; namely, a compound which is an N,N'-dihydrocarbylurea.

It is to be understood that the procedures to be discussed are equally applicable to the preparation of alkyl N-hydrocarbyl carbamates from compounds containing two or more 3hydrocarbylureido groups, it being merely necessary to employ the appropriate hydrocarbylureido-substituted compound as starting material in order to produce the corresponding alkyl N-hydrocarbylcarbamates.

In preparing an alkyl N-hydrocarbylcarbamate in accordance with the process of the invention, the appropriate N,N'-dihydrocarbylurea RNHCONHR', wherein R and R' each represent monovalent hydrocarbyl and are the same or different, is heated with the appropriate dialkylcarbonate at a temperature within the range of about 60° C. to about 200° C. and in the presence of a catalytic amount of a base.

Illustrative of the bases which can be employed as catalysts in the process of the invention are tertiary amines such as pyridine, quinoline, triethylenediamine, triethylamine, tributylamine, trihexylamine, N,N-dimethylaniline, N,N-diethylaniline, N,N-diisopropylaniline, N-methylpiperidine, N-ethylpiperidine, N-isopropylpiperidine, N,N'-dimethylpiperazine, N,N'-diethylpiperazine, N-methyl-N'-ethylpiperazine, N-methylmorpholine, N-ethylmorpholine, N-ethylmorpholine, N-hexylmorpholine, and the like; alkali metal hydroxides such as sodium hydroxide, potassium hydroxide, lithium hydroxide, and the like; and alkali metal alkoxides such as sodium methoxide, sodium methoxide potassium methoxide, potassium tert.-butoxide, and the like. The preferred bases for use as catalysts in the process of the invention are the tertiary amines.

By "catalytic amount" of the base is meant an amount less than a molar portion with respect to the compound containing the 3-hydrocarbylureido substituent. Advantageously the amount of base employed in accordance with the process of the invention is of the order of about 0.001 mole to about 0.1 mole per mole of 3-hydrocarbylureido compound and preferably is of the order of about 0.01 mole to about 0.05 mole per mole of 3-hydrocarbylureido compound.

Advantageously the base-catalyzed reaction of the 3-hydrocarbylureido compound and the dialkylcarbonate is carried out in the presence of an inert organic solvent. By the latter term is meant an organic solvent which is inert under the conditions of the reaction, i.e. does not enter into reaction with any of the reactants or interfere in any other way with the desired course of the reaction. Illustrative of inert organic solvents are benzene, toluene, xylene, tetralin, chlorobenzene, dichlorobenzene, trichlorobenzene, tetrachloroethane, carbon tetrachloride, petroleum ethers and the like.

The reactants, namely the 3-hydrocarbylureido compound, the dialkylcarbonate and the base catalyst can be brought together in any order, in the presence of the inert organic solvent if one is employed. The resulting mixture is then subjected to heating within the desired temperature range, as set forth above. The progress of the reaction can be followed by routine analytical techniques. For example, test samples can be removed from the reaction mixture and examined by vapor phase chromatography, by infrared spectroscopy, or by like spectrographic techniques, to determine the disappearance of absorption bands characteristic of the starting materials and/or the appearance of absorption bands characteristic of the desired end products.

When the reaction has been found to proceed to completion, as determined by the above type of analytical procedure, the desired alkyl N-hydrocarbylcarbamate can be isolated from the reaction product by conventional procedures. For example, the base catalyst can be neutralized with dilute mineral acid and the like, and the inert organic solvent, if present, can be removed by distillation. The residual alkyl N-hydrocarbylcarbamate or, when asymmetrical N,N'-dihydrocarbylurea is employed as starting material, the residual mixture of two different alkyl N-hydrocarbylcarbamates can be purified or separated, as the case may be, by conventional techniques such as chromatography, recrystallization (in the case of solids), or by distillation.

Advantageously, the starting 3-hydrocarbylureido compound and dialkyl carbonate are employed in substantially stoichiometric proportions in order to obtain high yields of the desired alkyl N-hydrocarbylcarbamates. However, as will be appreciated by one skilled in the art, the use of an excess, over stoichiometric proportions, of one or other of the reactants can be employed without seriously detracting from the desired course of the reaction; the economics of the overall operation will generally dictate the choice of proportions used, particularly when the process is carried out on a commercial scale.

As pointed out previously, the process of the invention can be applied to the conversion of compounds which contain a plurality of 3-hydrocarbylureido moieties in the molecule. In a particular aspect of the invention, the process described above can be applied to molecules which contain a plurality of ureido linkages in a polymeric chain. For example, the process of the invention can be applied to the treatment of polyureas and polyurethane/polyureas such as are obtained by reaction of a polyisocyanate and a polyamine or reaction of an isocyanate-terminated polyurethane prepolymer with a polyamine. The use of the process of the invention in this manner enables one to modify the properties of a polyurea or polyurethane/urea by shortening the chain length of said polymer and by introducing carbamate groups as terminal groups in the polymer chain. The latter groups can obviously be converted, as by acid hydrolysis of the ester and decarboxylation of the free carbamic acid, to the corresponding primary amino group thereby giving rise to an active center for further modification of the polymer.

The extent to which a polyurea or polyurethane/urea can be modified in the above manner is controlled by controlling the amount of dialkyl carbonate employed in the reaction. If desired, complete degradation of the polyurea or polyurethane/polyurea can be achieved, i.e. all the urea linkages in the polymer chain can be subjected to conversion. Thus the process of the invention can be employed to recover scrap polyurea, or scrap polymer containing urea linkages, by converting the scrap to alkyl N-hydrocarbyl urethanes corresponding to the polyamine from which the polymer was originally prepared.

The process of the invention can also be applied to the interaction of a polycarbonate and a polyurea or polyurethane to produce novel copolymers which possess an amalgam of the useful properties of the individual polymers from which they are derived. For example, the polymers so obtained from a polyurea and a polycarbonate possess the hardness of the polyurea starting material coupled with the clarity of the polycarbonate starting material and are thus highly useful in the fabrication of lenses, plastic windows, and the like. In preparing such copolymers the starting polyurea or polyurethane and the polycarbonate are brought together and reacted under the conditions described above. Interaction occurs at one or more of the recurring urea linkages in the one polymer starting material and at one or more of the carbonate linkages in the other polymer with the formation of carbamate linkages and resultant fusion of the two originally different polymer chains.

The mono- and poly-carbamates prepared in accordance with the process of the invention are for the most part known in the art and are known to be useful. For example, the N-hdyrocarbyl carbamates prepared in accordance with the process of the invention can be converted to the corresponding hydrocarbyl isocyanates by reaction with phosgene in the presence of an N,N-dialkyl-aliphatic amide using the procedure described in U.S. Pat. No. 3,404,170. The isocyanates so prepared are useful in a variety of ways as is discussed in detail in the latter patent.

The following examples illustrate the best mode contemplated by the inventors for carrying out their invention but are not to be construed as limiting the scope thereof.

EXAMPLE 1

A mixture of 20 g. (0.094 mole) of N,N'-diphenylurea, 10 ml. (0.117 mole) of dimethylcarbonate, 1 ml. (0.007 mole) of triethylamine and 100 ml. of chlorobenzene was heated under reflux for 8 hours. The resulting mixture was allowed to stand at room temperature ca. 25° C.) overnight before being filtered. The filtrate was evaporated to small volume and the solid (unchanged N,N'-diphenylurea; 2.1 g.; 10.5 percent recovery) which separated was removed by filtration. The filtrate was diluted with benzene, and washed with dilute hydrochloric acid solution, and the organic layer was dried, and evaporated to dryness. There was obtained 20.4 g. of crude methyl N-phenylcarbamate having a melting point of 42° C. representing a 79 percent theoretical yield based on N,N'-diphenylurea starting material consumed. Triphenylguanidine having a melting point of 145° to 147° C. (3.4 yield based on N,N'-diphenylurea consumed) was isolated as a minor fraction by neutralization of the acid extract.

EXAMPLE 2

A mixture of 9.8 g. (0.046 mole) of N,N'-diphenylurea, 5 ml. (0.059 mole) of dimethylcarbonate, 0.7 g. of triethylenediamine and 100 ml. of chlorobenzene was heated under reflux for 2 hours. At the end of this time the reaction mixture was cooled to c. 25° C., filtered, and then diluted with ether. The solution so obtained was washed with 10 percent aqueous hydrochloric acid and with water. The washings were extracted with ether and the combined ether solution and ether washings were dried and evaporated to dryness to yield methyl N-phenylcarbamate.

EXAMPLE 3

This example illustrates the criticality of the catalyst in the reaction described in examples 1 and 2.

A mixture of 2.1 g. (0.01 mole) of N,N'-diphenylurea, 1 ml. (0.12 mole) of dimethylcarbonate, and 25 ml. of chlorobenzene was heated under reflux for 5 hours. At the end of this time an aliquot was taken from the reaction mixture and subjected to vapor phase chromatography. No evidence of anything but unchanged N,N'-diphenylurea was found in this analysis. The main bulk of the reaction mixture was heated under reflux for a further 19 hours. At the end of this time vapor phase chromatography showed the presence of no detectable amount of methyl N-phenylcarbamate.

EXAMPLE 4

Using the procedure described in example 1, but replacing dimethylcarbonate by diethylcarbonate, there was obtained ethyl N-phenylcarbamate.

Similarly, using the procedure described in example 1, but replacing dimethylcarbonate by dibutylcarbonate, dihexylcarbonate, di(2-ethylhexyl-carbonate, and dioctylcarbonate, there were obtained butyl, hexyl, 2-ethylhexyl, and octyl N-phenylcarbamate, respectively.

EXAMPLE 5

Using the procedure described in example 1, but replacing N,N'-diphenylurea by N-phenyl-N-p-tolylurea, there was obtained a mixture of methyl N-phenylcarbamate and methyl N-p-tolylcarbamate.

Similarly, using the procedure described in example 1, but replacing N,N'-diphenylurea by N,N'-di-2-naphthylurea, N,N'-dicyclohexylurea, N,N'-dibenzylurea, N,N'-diallylurea, N,N'-di-2-octenylurea, N,N'-diethylurea, N,N'-di(2-ethylhexyl)urea, N-methyl-N'-phenylurea, N-benzyl-N'-phenylurea, or N,N'-d-1-cyclohexenylurea, there were obtained methyl N-2-naphthylcarbamate, methyl N-cyclohexylcarbamate, methyl N-benzylcarbamate, methyl N-allylcarbamate, methyl N-2-octenylcarbamate, methyl N-ethylcarbamate, methyl N-2-ethylhexylcarbamate, a mixture of methyl N-methylcarbamate and methyl N-phenylcarbamate, a mixture of methyl N-benzylcarbamate and methyl N-phenylcarbamate, and methyl N-1-cyclohexenylcarbamate, respectively.

EXAMPLE 6

Using the procedure described in example 1, but replacing N,N'-diphenylurea by 1,1'-o-phenylenebis (3-phenylurea), there was obtained a mixture of dimethyl N,N'-o-phenylenebiscarbamate and methyl N-phenylcarbamate.

EXAMPLE 7

Using the procedure described in example 1, but replacing the triethylamine there employed as catalyst by pyridine, triethylenediamine, N,N-dimethylaniline, N-methylpiperidine, N,N'-dimethylpiperazine, N-methylmorpholine, sodium hydroxide, sodium methoxide, or potassium tert.—butoxide, N,N'-diphenylurea was converted to methyl N-phenylcarbamate.

We claim:

1. A process for the preparation of an alkyl N-hydrocarbylcarbamate which comprises heating, at a temperature within the range of about 60° C. to about 200° C., a compound containing at least one 3-hydrocarbylureido moiety, wherein the hydrocarbyl moiety corresponds to that in the desired alkyl N-hdyrocarbylcarbamate, with a dialkyl carbonate in the presence of a catalytic amount of a base, wherein hydrocarbyl in each instance is selected from the group consisting of phenyl, tolyl, naphthyl, benzyl, alkyl from one to eight carbon atoms, inclusive, alkenyl from three to eight carbon atoms, inclusive, cyclohexyl, cyclohexenyl, and phenylene.

2. The process of claim wherein the compound containing the 3-hydrocarbylureido moiety is a 1,3-dihydrocarbylurea.

3. The process of claim 1 wherein the reaction is carried out in the presence of an inert organic solvent.

4. A process which comprises heating, at a temperature within the range of about 60° C. to about 200° C., a 1,3-dihydrocarbylurea and a dialkylcarbonate in the presence of a catalytic amount of a base, to obtain the corresponding alkyl N-hydrocarbyl carbamates, wherein hydrocarbyl in each instance is selected from the class consisting of phenyl, tolyl, naphthyl, benzyl, alkyl from one to eight carbon atoms, inclusive, cyclohexyl, cyclohexenyl, and phenylene.

5. The process of claim 4 wherein the reaction is carried out in the presence of an inert organic solvent.

6. The process of claim 4 wherein the 1,3-dihydrocarbylurea employed as starting material is 1,3-diphenylurea whereby there is obtained the corresponding alkyl N-phenylcarbamate.

7. The process of claim 4 wherein the two hydrocarbyl substituents in the starting 1,3-dihydrocarbylurea are not identical whereby there is obtained a mixture of the two corresponding alkyl N-hydrocarbylcarbamates.

8. A process which comprises heating, at a temperature within the range of about 60° C. to about 200° C., 1,3-diphenylurea and a dialkylcarbonate in the presence of a catalytic amount of a tertiary amine whereby there is obtained the corresponding alkyl N-phenylcarbamate.

9. The process of claim 8 wherein the dialkylcarbonate is dimethylcarbonate whereby there is obtained methyl N-phenylcarbamate.

10. The process of claim 8 wherein the tertiary amine is triethylamine.

* * * * *